United States Patent [19]

Duncan

[11] 4,389,368

[45] Jun. 21, 1983

[54] FAILSAFE COOLANT PUMP FOR NUCLEAR REACTOR

[76] Inventor: Richard J. Duncan, 20800 Homestead Rd., Apt. 3C, Cupertino, Calif. 95014

[21] Appl. No.: 177,994

[22] Filed: Aug. 15, 1980

[51] Int. Cl.³ ............................................. G21C 9/00
[52] U.S. Cl. .................................. 376/283; 376/285; 415/122 R
[58] Field of Search ............... 376/210, 233, 282, 283, 376/285; 415/122 R; 417/319; 192/46

[56] References Cited

U.S. PATENT DOCUMENTS

| 3,278,385 | 10/1966 | Duframe | 376/233 |
| 3,918,272 | 11/1975 | Howold et al. | 415/122 R |
| 3,918,830 | 11/1975 | Schneider | 415/122 R |
| 3,949,567 | 4/1976 | Stech | 415/122 R |
| 4,036,561 | 7/1977 | Harand et al. | 376/285 |
| 4,064,001 | 12/1977 | Duncan | 376/282 |
| 4,289,043 | 9/1981 | Chabre et al. | 376/285 |

Primary Examiner—Sal Cangialosi
Attorney, Agent, or Firm—Robert W. Dilts

[57] ABSTRACT

An improved pressurized fluid reactor system having a fluid cooled reactor core in which the coolant pump for delivering fluid to the reactor core is driven by a pump motor through a unidirectional drive means which enables the pump to operate at a greater speed than the pump motor in the pumping direction only. A preferred unidirectional drive means in the form of a ratchet means is disclosed.

4 Claims, 7 Drawing Figures

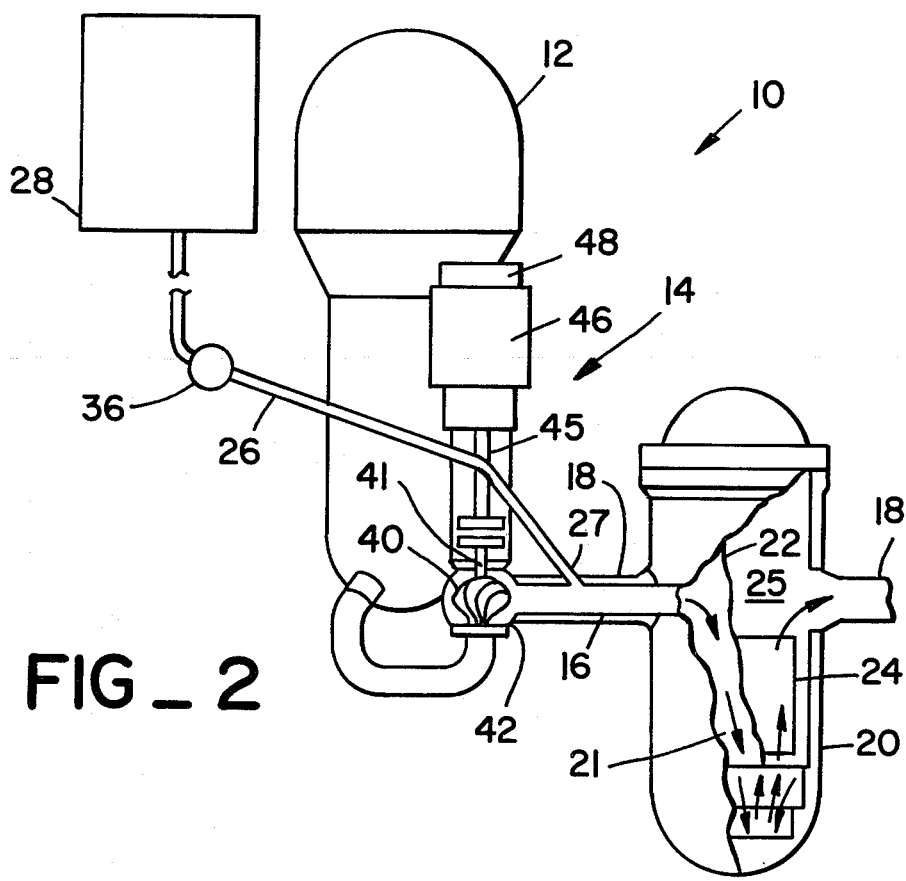
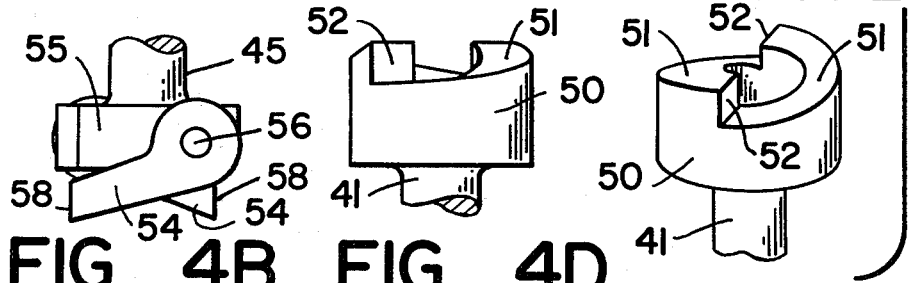
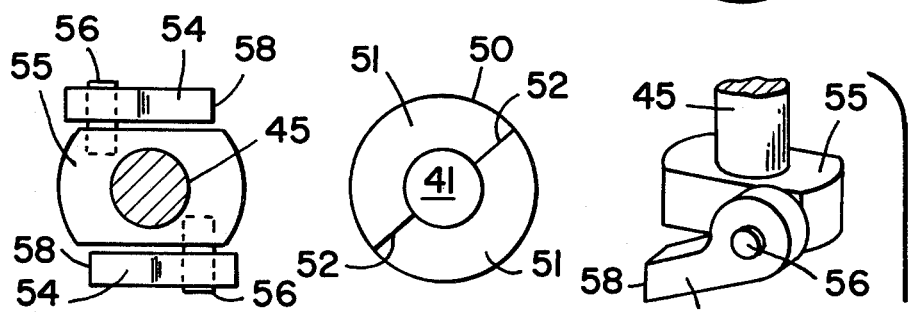

FAILSAFE COOLANT PUMP FOR NUCLEAR REACTOR

DESCRIPTION

Background of the Invention

This invention relates to high pressure fluid cooled nuclear reactors and means for minimizing the effects of a loss-of-coolant through a cold leg break or loss-of-power to the reactor coolant pumps.

In the event of an accident in which there is a break in the cold leg of the reactor coolant system, it has been postulated that the entire coolant medium which absorbs and removes the heat generated in the nuclear core will be lost or at least considerably decreased.

If sufficient coolant water does not reach the reactor core within the first minute following the accident, the entire reactor core, fuel and supporting structure begins to melt down and slump to the bottom of the reactor vessel. Emergency cooling water injected at this stage may well amplify the disaster as the now molten metals can react violently with water, generating large quantities of heat, releasing steam and hydrogen in amounts and at pressures that can themselves breach the containment. If the containment vessels themselves do not burst, it has been postulated that the molten mass of fuel would continue to melt downward, fed by the heat generated by fission product radioactivity.

If a break occurs in the cold leg between the reactor vessel and the coolant pump causing the loss of coolant accident, then the first path for pressure relief is down through the middle of the reactor core and up through the outer annulus between the core support barrel and the pressure vessel walls and out through the cold leg to the break. This flow is opposite to the normal flow of reactor coolant as well as the flow of emergency core cooling water being injected into that leg, thereby impeding the flooding of the reactor core from the bottom. The second path for pressure relief is from the plenum above the reactor core out through the hot leg to the steam generator, through the steam generator and through the coolant pump to the cold leg break where the steam is discharged to the atmosphere. The steam that flows through this path is being driven by the pressure differential between the high pressure in the reactor plenum above the core and the containment building pressure which is initially atmospheric. Consequently, the steam flow rate is very high and the steam tends to drive the reactor pump like a turbine. This circumstance produces the substantial danger of over speeding the reactor coolant pump to the point where the massive flywheel connected to the reactor coolant pump shaft disintegrates and eventually would cause severe damage to the surrounding equipment.

Flywheels store the energy required to maintain sufficient cooling flow after a loss-of-power to the driving motors. Absence of the flywheels would allow the motor and its coupled pump to slow, or stop, more rapidly, such that the slowing, or stationary pump impeller would seriously restrict the coolant flow. This desirable flow is traversing in the desired direction due to the previously established momentum of the fluid and the thermal driving head established by the fluid being heated in the reactor and being cooled by the steam generators. Restriction of this flow is undesirable.

It is to the solution of these problems that the present invention is directed.

One prior art solution to the problem is represented by U.S. Pat. Nos. 4,017,217 issued Apr. 12, 1977 to Robert P. Lamers and 4,036,561 issued July 19, 1977 to Elmar Harand et al. According to the teachings of these patents, brake means are provided to prevent overspeeding of the coolant pump and motor. However, in the event of a loss of coolant accident, it is desirable to maintain the flow established by the fluid momentum and the thermal driving head to reduce the temperature of the reactor. The braking of the coolant pumps according to the teaching of the prior art will at least limit the flow of coolant and will tend to actually impede the flow of coolant under these emergency conditions and will be no benefit during the loss-of-power casualty.

Other prior art solutions are represented by U.S. Pat. No. 4,064,001, issued Dec. 20, 1977 to Richard J. Duncan and the article in the April 1970 issue of "Power Magazine" on pages 90–91. According to these solutions, valve means are provided to help maintain normal flow direction through the reactor vessel. While these would reduce the amount of stored energy which would cause pump overspeed, it is expected that these reductions would be insufficient to solve the overspeed problem. These solutions are expected to have no effect on the loss-of-power casualty.

SUMMARY OF THE INVENTION

According to this invention, an improvement is provided in a pressurized fluid nuclear steam supply system which not only provides overspeed protection to prevent the failure of a flywheel caused by an overspeed condition of the pump, but also enhances the flow of fluid under other emergency conditions. An analysis of a pump fitted with this means might indicate that the pump motors could be fitted with smaller flywheels and might further indicate that the flywheel could be eliminated. The improvement comprises a unidirectional drive means interposed between the coolant pump and the motor driving the pump. The unidirectional drive means is adapted to enable the pump to operate in the pumping direction only at a greater speed than the motor which normally drives it. That is, it allows the impeller to free-wheel in the pumping direction.

BRIEF DESCRIPTION OF THE DRAWING

FIG. 2 is a fragmentary side view of a portion of the reactor coolant system of FIG. 1 partially broken away to show the improvement of this invention.

FIG. 3 is an exploded fragmentary perspective view showing a unidirectional drive means according to one embodiment of this invention.

FIGS. 4A and 4B are top and side views respectively of one element of the drive means of FIG. 3.

FIGS. 4C and 4D are top and side views respectively of the other element of the drive means of FIG. 3.

DESCRIPTION OF THE PREFERRED EMBODIMENT

Figure 1:
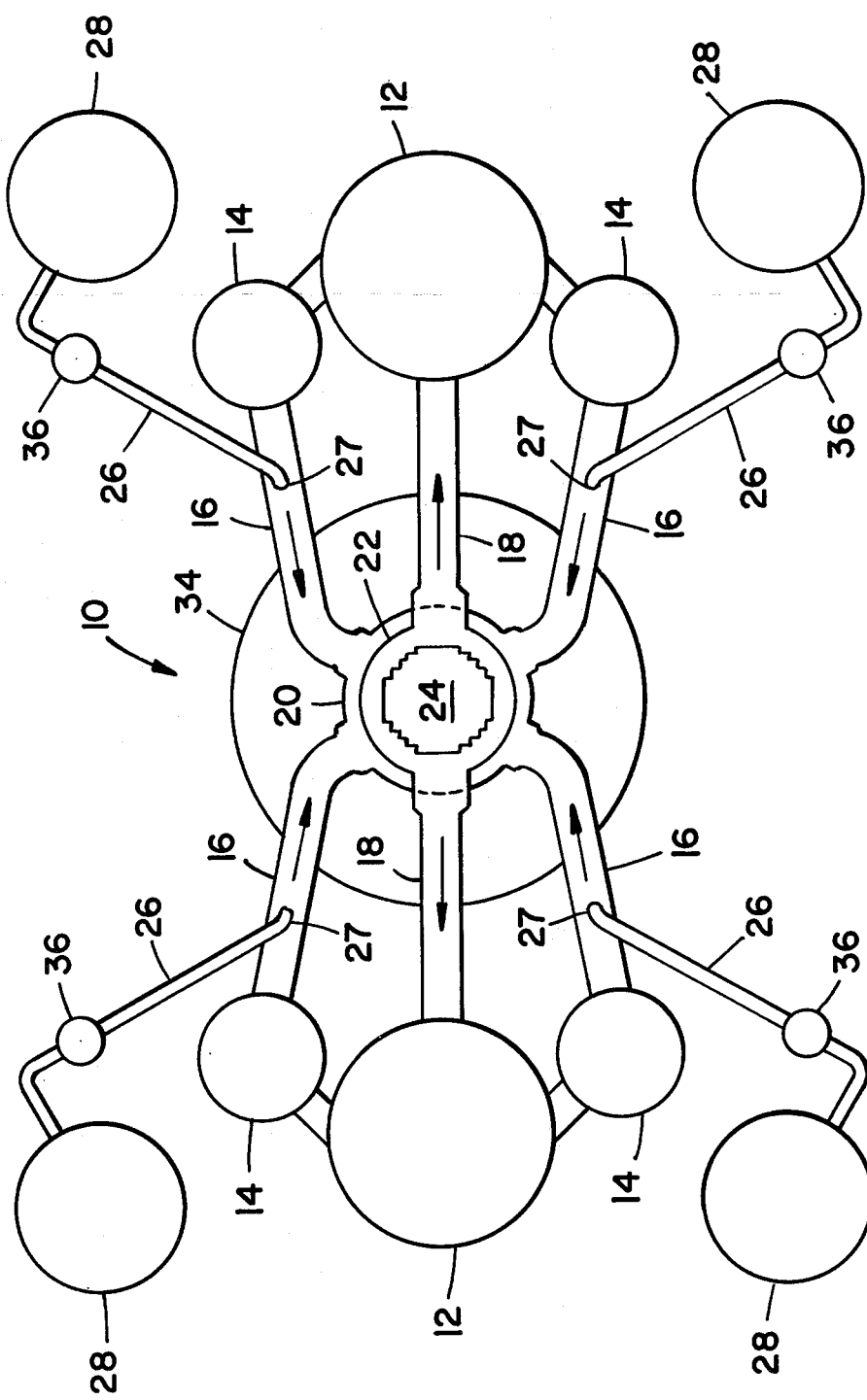
FIG. 1 is a plan view of a reactor coolant system arrangement.

Referring now to FIG. 1, there is shown a nuclear reactor 10 including a nuclear reactor pressure vessel 20 surrounded by biological shielding 34 and having an active core or fuel region 24 therein. Core 24 is supported in the reactor pressure vessel 20 in a well-known manner by core support barrel 22 (not shown). The reactor coolant is circulated through the cold leg 16 by the reactor coolant pump 14. As best seen in FIG. 2, the cold coolant enters the reactor pressure vessel 20 and impinges upon the core support barrel 22. The flow of the coolant is then deflected downwardly to pass through the annular region 21 between the core support barrel 22 and the reactor pressure vessel 20 to the lower portions of the reactor pressure vessel where it is deflected upwardly to pass to the interior of the reactor core support barrel. Once on the interior of the reactor core support barrel, the coolant flows upwardly through the fuel assemblies (not shown) of the reactor core 24 and subsequently passes into the reactor plenum 25 immediately above the reactor core 24. From here the coolant is again deflected to pass out of the reactor pressure vessel 20 and into hot leg 18 by which means it is delivered to steam generator 12. During its passage through the steam generator 12, the coolant is cooled in a well-known manner by transferring its heat content to the secondary coolant system. After being cooled in the steam generator 12, the primary coolant is recirculated by the reactor coolant pump 14 and the cycle is repeated.

Also shown in FIGS. 1 and 2 is a portion of the emergency core cooling system which includes storage tank 28, check valve 36 and delivery pipe 26. Storage tank 28 contains a large quantity of highly borated water. Check valve 36 is designed to permit the passage of the borated water contained in tank 28 to the primary coolant system by means of pipe 26 when the pressure in the primary coolant system drops below a predetermined pressure. Such a pressure drop occurs with a loss of coolant accident or LOCA. The borated water is then injected into the primary coolant system at penetration 27 in the cold leg 16. The borated emergency coolant is injected under a high pressure so that the coolant is caused to flow through the cold leg 16 into the reactor vessel 20, and down through the annulus 21 between the reactor vessel 20 and the core support barrel 22 to reflood the reactor core 24 from the bottom.

As best shown in FIG. 2, a coolant pump 14 comprises a pump impeller 40 mounted by means of a shaft 41 in a pump housing 42 which is interposed in the cold leg 16 of the reactor system. The pump shaft 41 is mechanically coupled to the drive shaft 45 of an electric motor 46. In the prior art the coupling between the pump shaft 41 and the drive shaft 45 comprised a pair of plates or flanges each rigidly fixed to a different one of the shafts 41 and 45. The flanges were then bolted together in order to provide a rigid mechanical coupling between the shafts 41 and 45 and yet allow the shafts to be disconnected so that the pump housing 42 could be removed from the system to allow repair of the impeller 40 and pump seals on the impeller shaft 41 as necessary. Also, in the prior art, the motor 46 was provided with a fly-wheel represented generally at 48 to maintain rotation of the motor 46 and pump impeller 40 in the event of a power failure.

According to this invention, the mechanical coupling between the pump shaft 41 and the drive shaft 45 is provided by a unidirectional drive means adapted to enable the pump impeller 40 to rotate at a higher rotational speed than the rotational speed of the motor 46 in the pumping direction only. One preferred embodiment of the unidirectional drive means according to this invention is shown in FIGS. 3 and 4 with rotation in the clockwise direction corresponding to the pumping direction. Referring to FIG. 3, a ratchet block 50 is rigidly fixed to the free end of the pump shaft 41. According to this embodiment of the invention, a pair of semicircular cam surfaces 51 are provided on the surface of the cam block 50 facing the drive shaft 45. Each of the cam surfaces 51 terminates in an abutment surface or ratchet tooth 52.

Similarly, according to this embodiment of the invention, one or more ratchet arms 54 are mounted on a mounting block 55 by pivot means 56 at one end of the arm 54. The mounting block 55 is rigidly fixed to the free end of the drive shaft 45. The free end of each ratchet arm 54 is provided with an abutment surface 58 adapted to engage the abutment surface or ratchet tooth 52 of the ratchet block 50.

In operation, the ratchet block 50 and mounting block 55 as shown in FIG. 3, would be brought into close spaced relationship to each other with the axes of the pump shaft 41 and the drive shaft 45 in coaxial alignment. Relative rotational movement of the drive shaft 45 about its axis in a clockwise direction with respect to the drive shaft 41 would force the surfaces 58 at the free ends of the ratchet arms 54 into abutment with the ratchet teeth 52 of the ratchet block 50 causing the pump shaft 41 to rotate in a clockwise direction with the drive shaft 45. If the drive shaft 45 should cease to rotate in a clockwise direction, the pump shaft 41 can freely continue to rotate in a clockwise direction with the cam arms 54 riding on the cam surfaces 51 and ratcheting over the ratchet teeth 52. Similarly, the pump shaft 41 may rotate in a clockwise direction at a higher rotational rate than the rate of clockwise rotation of the drive shaft 45. However, the pump shaft 41 cannot rotate in a counterclockwise direction with respect to the drive shaft 45.

In the event of a loss of coolant accident or LOCA, due to a leak in the cold leg of the system between the pump 14 and the reactor pressure vessel, a high rate of flow of fluid through the pump housing 42 will occur tending to drive the impeller 40 of the pump 14 at a very high rate of speed. According to the teaching of this invention, the impeller 40 of the pump 14 will be permitted to free-wheel with respect to the motor 46 and flywheel 48. Thus, there will be no tendency to drive the motor 46 and flywheel 48 at an excessive rotational speed and yet the flow of fluid through the system will not be impeded. Furthermore, the flow of fluid in the normal direction proper for facilitating the introduction of borated water under emergency conditions will be enhanced.

It is believed that those skilled in the art will make obvious modifications in the specific embodiment of this invention as shown in the drawing without departing from the scope of the following claims. Any number of ratchet teeth and ratchet arms may be used. Spring-loaded ratchet teeth or ratcheting means of any type capable of handling the forces involved can be used. Furthermore, other unidirectional drive means such as unidirectional bendix or unidirectional fluid drives may be used, although neither would be as efficient as the preferred ratchet drive. In addition, a unidirectional fluid drive would not be as effective as the preferred ratchet drive in enhancing the flow of fluid in the normal direction under emergency conditions.

I claim:

1. In a pressurized fluid nuclear reactor system having a fluid cooled reactor core contained within a reactor vessel, means for delivering the fluid coolant to the reactor core including a centrifugal type coolant pump having a housing and a shaft projecting from said housing, said shaft driven by a drive shaft in vertical end-toend coaxial relation and means for removing the fluid coolant from the reactor core including a steam generator, said coolant pump delivering coolant from said steam generator to said reactor core and back to said steam generator in a continuous cycle, the improvement consisting a unidirectional drive means in the form of a ratchet means acting along the coaxial axes of said pump shaft and said drive shaft in a plane interposed between the ends of said pump shaft and said drive shaft and exterior of said pump housing enabling said coolant pump to operate at a greater rotational speed than said drive shaft in the pumping direction only said ratchet means comprising a ratchet block rigidly fixed on the end of one of said drive shaft and said pump shaft with a ratchet tooth projecting toward the end of the other of said drive shaft and said pump shaft, a ratchet arm mounting block rigidly fixed on the end of the other of said drive shaft and said pump shaft, a ratchet arm engaging said ratchet tooth upon relative rotation of said drive shaft with respect to said pump shaft in the pumping direction only, and means mounting said ratchet arm on said ratchet mounting block for movement only along said coaxial axes of said drive shaft and said pump shaft.

2. The improvement of claim 1 wherein said ratchet block is located below said ratchet arm mounting block and said ratchet arm is mounted for pivoting movement by force of gravity along said coaxial axes of said drive shaft and said pump shaft.

3. The improvement of claim 2 including a pair of said ratchet teeth and a pair of said ratchet arms each at opposite sides of said coaxial axes of said drive shaft and said pump shaft.

4. The improvement of claim 2 wherein the abutment surfaces of said ratchet teeth extend diametrically of said drive shaft and said pump shaft and wherein said ratchet arms each extend in a different plane which is substantially tangential to said drive shaft and said pump shaft.

* * * * *